United States Patent
Velayudhan et al.

(10) Patent No.: US 11,184,416 B2
(45) Date of Patent: *Nov. 23, 2021

(54) CONTINUING ELECTRONIC MEDIA ENTERTAINMENT AFTER COMPLETION OF TRAVEL SEGMENT

(71) Applicant: Viasat, Inc., Carlsbad, CA (US)

(72) Inventors: Nirmalkumar Velayudhan, San Marcos, CA (US); Joshua J. Righetti, Carlsbad, CA (US); Jonathan M. Putnam, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,697

(22) Filed: Nov. 27, 2018

(65) Prior Publication Data

US 2019/0230140 A1    Jul. 25, 2019

Related U.S. Application Data

(63) Continuation of application No. 15/097,403, filed on Apr. 13, 2016, now Pat. No. 10,171,531.

(51) Int. Cl.
*H04L 29/06* (2006.01)
*H04N 21/433* (2011.01)
(Continued)

(52) U.S. Cl.
CPC ..... *H04L 65/4084* (2013.01); *H04B 7/18508* (2013.01); *H04L 65/4069* (2013.01);
(Continued)

(58) Field of Classification Search
CPC . B64D 11/0015; G06F 21/10; H04L 63/0428; H04L 65/4069; H04L 65/4084;
(Continued)

(56) References Cited

U.S. PATENT DOCUMENTS 7,343,157 B1    3/2008  Mitchell
7,702,328 B2    4/2010  Lemond et al.
(Continued)

OTHER PUBLICATIONS

A. Jahn et al., "Evolution of Aeronautical Communications for Personal and Multimedia Services," in IEEE Communications Magazine, vol. 41, No. 7, pp. 36-43, Jul. 2003. (Year: 2003).*
(Continued)

*Primary Examiner* — Vivek Srivastava
*Assistant Examiner* — William C McBeth
(74) *Attorney, Agent, or Firm* — Holland & Hart LLP

(57) ABSTRACT

Continuing electronic media entertainment on a personal electronic device (PED) after completion of a travel segment. Streaming characteristics for streaming of an electronic media item to a PED on board an aircraft via a first connection may be monitored and, if streaming of the remaining portion of the electronic media item will exceed the remaining travel time, trigger some or all of an excess portion of the electronic media item to be sent to the PED. The PED may store the excess portion in an access-controlled media file. After completion of the travel segment (e.g., at the destination location), the PED may resume playback of the electronic media item by obtaining a playback control code via a second, different connection. The second connection may be a different type of connection, or may be an indirect connection, in some cases.

20 Claims, 10 Drawing Sheets

(51) Int. Cl.
H04N 21/214 (2011.01)
H04B 7/185 (2006.01)
H04L 29/08 (2006.01)
H04N 21/432 (2011.01)

(52) U.S. Cl.
CPC .......... H04L 65/604 (2013.01); H04L 67/12 (2013.01); H04L 67/18 (2013.01); H04L 67/28 (2013.01); H04N 21/2146 (2013.01); H04N 21/433 (2013.01); *H04N 21/432* (2013.01)

(58) Field of Classification Search
CPC ..... H04L 65/60; H04L 65/601; H04L 65/604; H04L 67/12; H04L 67/18; H04L 67/28; H04N 21/214; H04N 21/2146; H04N 21/21816; H04N 21/21875; H04N 21/4126; H04N 21/41407; H04N 21/432; H04N 21/433; H04N 21/4334; H04N 21/4405; H04N 21/41422; H04N 21/44204

See application file for complete search history.

(56) References Cited

U.S. PATENT DOCUMENTS

| | | | |
|---|---|---|---|
| 8,037,200 | B2 | 10/2011 | Margis et al. |
| 8,135,773 | B2 | 3/2012 | Stopniewicz et al. |
| 8,347,340 | B2 | 1/2013 | Lynch et al. |
| 8,406,453 | B2 | 3/2013 | Henson |
| 8,903,278 | B2 | 12/2014 | Murakami et al. |
| 8,972,598 | B2 | 3/2015 | Heron et al. |
| 9,003,454 | B2 | 4/2015 | Keen et al. |
| 9,749,662 | B2 | 8/2017 | Easterling et al. |
| 9,967,595 | B1* | 5/2018 | Provost .............. H04N 21/2146 |
| 2006/0107295 | A1 | 5/2006 | Margis et al. |
| 2009/0138920 | A1 | 5/2009 | Anandpura |
| 2009/0165049 | A1* | 6/2009 | Sekiguchi .......... H04N 21/4126 725/39 |
| 2010/0077463 | A1 | 3/2010 | Rickelton-Abdi |
| 2010/0154021 | A1* | 6/2010 | Howarter ........... H04N 21/4126 725/141 |
| 2010/0262509 | A1 | 10/2010 | Delia et al. |
| 2011/0157801 | A1 | 6/2011 | Satterfield |
| 2012/0011551 | A1* | 1/2012 | Levy .................. H04N 21/4532 725/82 |
| 2012/0290436 | A1 | 11/2012 | Frost |
| 2013/0117354 | A1 | 5/2013 | Lesser |
| 2014/0208371 | A1 | 7/2014 | Mori |
| 2014/0280491 | A1 | 9/2014 | Heron |
| 2014/0282681 | A1 | 9/2014 | Carney |
| 2014/0282684 | A1 | 9/2014 | Keen et al. |
| 2014/0359655 | A1 | 12/2014 | Diehl |
| 2015/0026713 | A1 | 1/2015 | Jain et al. |
| 2015/0208205 | A1 | 7/2015 | Chan et al. |
| 2015/0245078 | A1* | 8/2015 | Couleaud .......... H04N 21/2146 725/76 |
| 2015/0350709 | A1 | 12/2015 | Tomita |
| 2016/0126776 | A1* | 5/2016 | Kim .................... H04W 88/02 320/108 |
| 2016/0127334 | A1 | 5/2016 | Bangole et al. |
| 2017/0026676 | A1 | 1/2017 | Watson et al. |
| 2017/0034554 | A1* | 2/2017 | Tang .................. H04N 21/4331 |
| 2017/0126622 | A1* | 5/2017 | Haak .................. H04L 63/0209 |
| 2017/0149855 | A1 | 5/2017 | Doshi |
| 2018/0007155 | A1 | 1/2018 | Saito |

OTHER PUBLICATIONS

WO2015/154720 A1, Oct. 15, 2015, WIPO, Tang et al., (Year: 2015).*
Wang et al., "Distributed Cabin Wireless Content Streaming", IP.com Prior Art Database, Jun. 30, 2015. (Year: 2015).*
Samuely, "*Amazon, JetBlue Partnership Brings Prime Instant Video to Skies*", May 6, 2015, Mobile Marketer, www.mobilemarketer.com/cms/news/strategy/20369.html, 3 pgs.
Live TV, "*Content Distribution of The LiveTV Ka Connectivity System*", Apr. 3, 2014, 33 pgs.
Trejos, Nancy, "*Will iPads Revolutionize In-Flight Entertainment?*", Jan. 8, 2013, USA Today, 3 pgs., http://usat.ly/UK2pdM.
Kollau, "Virgin America goes Hybrid, adds wireless IFE into its RED entertainment system", airlinetrends.com, published Sep. 25, 2011,—http://www.airlinetrends.com/2011/03/25/virgin-america-hybrid-inflight-entertainment-system/-, accessed Apr. 30, 2018.
Zahmati et al., "Emerging Wireless Applications in Aerospace: Benefits, Challenges, and Existing Methods", Fourth Annual Canes Fly by Wireless Workshop, Jun. 2011, pp. 1-4.

* cited by examiner

CONTINUING ELECTRONIC MEDIA ENTERTAINMENT AFTER COMPLETION OF TRAVEL SEGMENT

CROSS REFERENCES

The present Application for Patent claims the benefit of U.S. Non-Provisional patent application Ser. No. 15/097,403 by VELAYUDHAN, et al., entitled "CONTINUING ELECTRONIC MEDIA ENTERTAINMENT AFTER COMPLETION OF TRAVEL SEGMENT," filed Apr. 13, 2016, the contents of which are incorporated by reference for all purposes.

BACKGROUND

Field of the Disclosure

The present disclosure relates to consumption of electronic media in general, and in particular, to enhancing the ability to consume electronic media during and after completion of commercial travel.

Relevant Background

As the use of communications and networking continues to grow around the world, users are demanding a more seamless content-enjoyment experience in mobile environments such as commercial transportation vehicles. For example, users may want to use their own personal electronic devices (PEDs) to consume media content while on a commercial transportation vehicle such as an aircraft. However, when consuming (e.g., streaming) media content on a PED, completion of streaming may be unpredictable. For example, the user may pause streaming for periods of time during the travel segment of the aircraft. If the travel segment ends (or that portion of the segment where PED usage is allowed) prior to the completion of streaming, the user's experience may be unsatisfactory. In addition, some media content is subject to digital content protection or various distribution restrictions. Furthermore, network access once a user disembarks the aircraft can be highly variable and therefore the ability to resume streaming via an alternative connection may be uncertain. The ability to provide a high-quality user experience for in-flight entertainment in these environments presents many challenges.

SUMMARY

Methods, systems, and devices are described for continuing electronic media entertainment on a personal electronic device (PED) after completion of a travel segment. A media playback manager may monitor streaming characteristics for streaming of an electronic media item to a PED on board an aircraft via a first connection and, if streaming of the remaining portion of the electronic media item will exceed the remaining travel time, trigger some or all of an excess portion of the electronic media item to be sent to the PED. The PED may store the excess portion in an access-controlled media file. The PED may receive input for resuming playback of the electronic media item after completion of the travel segment (e.g., at the destination location), and send a request for a playback control code to the media playback manager via a second, different connection. The media playback manager may receive and process the request for the playback control code, and may transmit a playback control code to the PED via the second connection. The PED may use the playback control code for decoding of the access-controlled media file to resume playback of the electronic media item.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
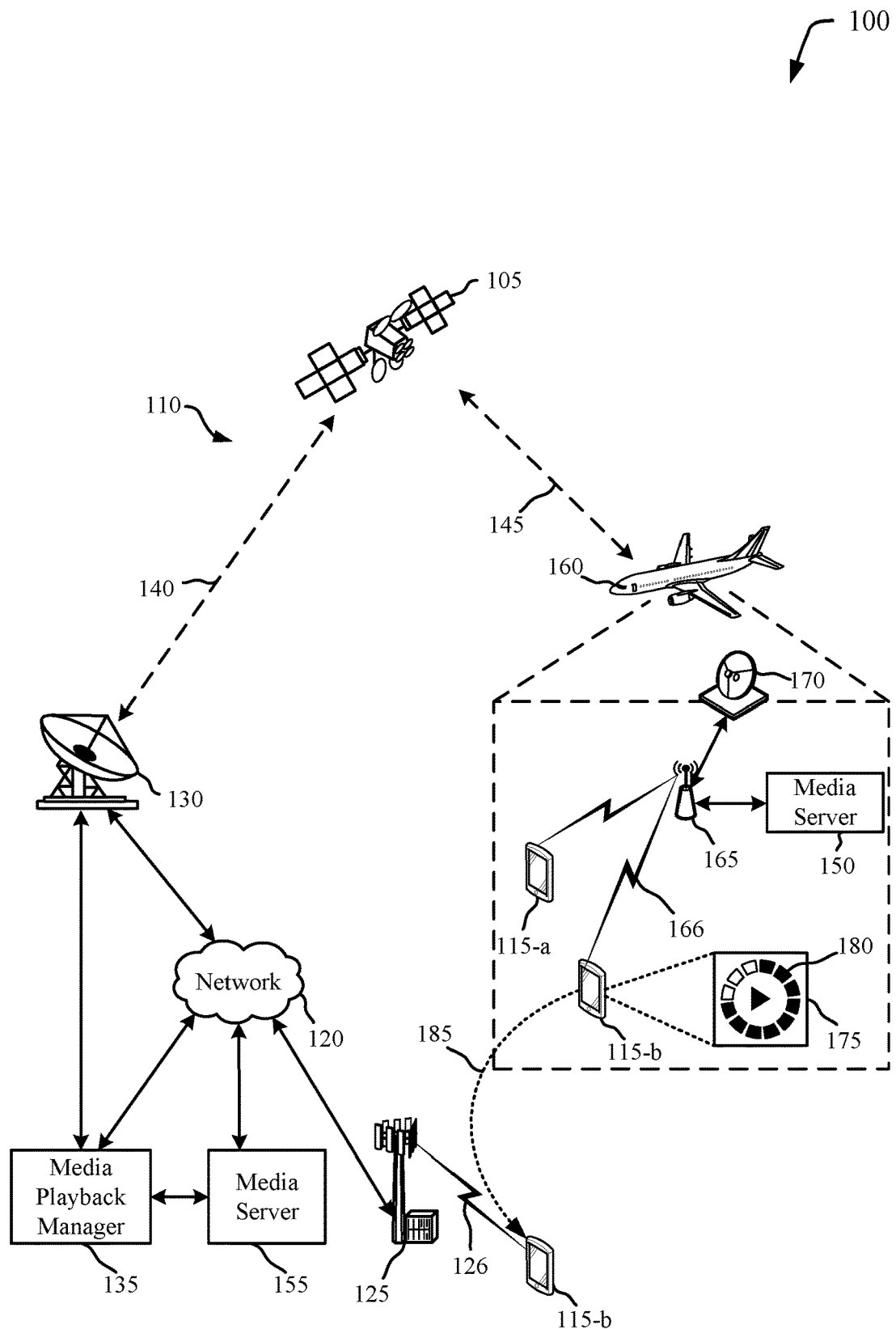
FIG. 1 shows an example communications environment for continuing electronic media entertainment after completion of a travel segment in accordance with various aspects of the disclosure.

The described features generally relate to continuing electronic media entertainment on a personal electronic device (PED) after completion of a travel segment. A passenger on an aircraft may connect a PED to a media server via a first connection. The first connection may be, for example, a connection to an access point of an on-board local area network (LAN) or wireless local area network (WLAN). The passenger may begin streaming an electronic media item from the media server, which may be on board the aircraft, or may be accessible via an aircraft communications link between the on-board network and other networks (e.g., the Internet).

A media playback manager may monitor streaming metrics for the streaming session and flight metrics for the aircraft. If the time remaining for streaming of the electronic media item exceeds a time remaining for the flight, the media playback manager may trigger the media server to send an excess portion of the electronic media item to the PED for storage in an access-controlled media file. Playback of the access-controlled media file may be controlled using a variety of techniques including encryption, dictionary coding, file-level access control, and/or application-level access control.

After disembarking the aircraft, the PED may establish a second connection via a second access point at the destination location, which may be the same or a different type of access point as the first access point. When the passenger indicates that they wish to resume playback of the electronic media item at the destination location the PED may send a playback request and receive a playback control code via the second connection. The playback control code may be, for example, a decryption key, a fingerprint, or an authorization code permitting playback of the electronic media item. The passenger may thus enjoy a seamless media experience in situations in which direct access to the electronic media item is not available because of bandwidth constraints of the second connection, or other distribution restrictions on the electronic media item.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Consumers are rapidly becoming accustomed to consuming electronic media on their own PEDs while travelling. PEDs include, for example, laptop computers, tablet computers, smartphones, phablets, and the like. The electronic media experience available to consumers can include audio and video on demand (AVOD) and use of audio and video sharing services (e.g., YouTube, Vine, etc.). AVOD sources can include in-flight entertainment (IFE), which refers to multimedia content available to passengers on airplanes. While IFE continues to be available to passengers on aircraft-mounted systems (e.g., seatback LCD screens, etc.) on some aircraft, passengers may also be able to stream the multimedia content directly to their PEDs (e.g., over an in-flight Wi-Fi system, etc.). In some cases, IFE includes "early-release" content that may not be otherwise available on-demand. For example, a movie may have an early-release window after the theatrical window where it is available as IFE but not on other AVOD content providers.

In addition, aircraft passengers may be provided network access service via an aircraft communication link. For example, users may connect their communication devices to an access point on the aircraft (e.g., WLAN access point, etc.), which routes data communications to other networks (e.g., the Internet) via the aircraft communication link. The aircraft communication link may be a wireless link (e.g., cellular link, satellite communications link, etc.), and may have sufficient communication bandwidth to support broadband experiences (e.g., streaming media, etc.) for multiple passengers on the aircraft at the same time.

Because of these distribution controls or limitations, some content may be unavailable after a passenger disembarks from an aircraft. Additionally, ability to stream media from various AVOD sources may be limited in some destinations, making access to AVOD content unreliable. Where a passenger begins streaming either IFE or content from an AVOD provider, the time for completion of the streaming session may be unpredictable due to the ability to pause or re-stream portions of the content. Lack of predictability for completion of streaming, and uncertain access to the content due to network connectivity differences, distribution limitations, or distribution restrictions, may hinder the ability of the consumer to complete consumption of the content.

FIG. 1 shows an example communications environment 100 for continuing electronic media entertainment after completion of a travel segment in accordance with various aspects of the disclosure. The communications environment 100 includes an aircraft 160 configured for providing multimedia content for consumption by passengers using PEDs 115. For example, PEDs 115-a and 115-b may establish a connection 166 with access point 165 on the aircraft 160. Access point 165 may be, for example, a WLAN access point (e.g., Wi-Fi access point). The multimedia content may be, for example, served by media server 150 or media server 155 (e.g., via aircraft communications link 145).

In the example communications environment 100, the aircraft communications link 145 is a communications link of a satellite communications system 110. Alternatively, the aircraft communication link 145 may be a different type of communications link, such as an air-to-ground link. The satellite communications system 110 may include a satellite 105 (or multiple satellites 105) and a gateway 130 (or multiple gateways 130). The satellite or satellites 105 may include any suitable type of communication satellite. In some examples, some or all of the satellites 105 may be in geostationary orbits. In other examples, any appropriate orbit (e.g., medium earth orbit (MEO), low earth orbit (LEO), etc.) for satellite 105 may be used. In one embodiment, the satellite 105 operates in a multi-beam mode, transmitting a number (e.g., typically 20-150, etc.) of satellite spot beams each directed at a different region of the earth. This can allow coverage of a relatively large geographical area and frequency re-use within the covered area. Spot beams for communication with satellite terminals may be called service beams while spot beams for communication with gateways 130 may be called feeder beams. In operation, the satellite communications system 110 provides network access service for multiple communication terminals including aircraft terminal 170. The network access service may include connectivity to one or more networks 120, which may include any suitable public or private networks and may be connected to other communications networks such as the Internet, telephony networks (e.g., Public Switched Telephone Network (PSTN), etc.), and the like.

The gateway 130 sends and receives signals to and from the satellite 105 via communication link 140. The gateway 130 may be two-way capable and designed with adequate transmit power and receive sensitivity to communicate reliably with the satellite 105. The gateway 130 may be connected to the one or more networks 120.

The aircraft terminal 170 may communicate signals with the satellite 105 via the communication link 145. The aircraft terminal 170 may include an antenna mounted to an elevation and azimuth gimbal which points the antenna (e.g., actively tracking) at satellite 105. The satellite communications system 110 may operate in the International Telecommunications Union (ITU) Ku, K, or Ka-bands, for example from 17 to 31 Giga-Hertz (GHz). Alternatively, satellite communications system 110 may operate in other frequency bands such as C-band, X-band, S-band, L-band, and the like. Although discussed with reference to aircraft terminal 170, similar techniques may be used in other applications besides onboard the aircraft 160, such as onboard boats, trains, vehicles, or a stationary location where network access service is desired (e.g., a business, a school, etc.), in some cases.

The satellite communications system 110 may also include one or more subscriber terminals (not shown), which may also be provided network access service via satellite spot beams of satellite 105. Each subscriber terminal may provide network access service for one or more customer premises equipment (CPE) (e.g., desktop computers, laptops, set-top boxes, smartphones, tablets, Internet-enabled televisions, and the like). The satellite communications system 110 may support communication links to multiple aircraft terminals 170 and multiple subscriber terminals via the same service beams (e.g., using multiple access techniques such as FDMA, TDMA, etc.).

Media server 150 may be configured for providing in-flight entertainment to passengers on-board aircraft 160. In some examples, the media server 150 may be on-board aircraft 160. The media server 150 may store content for access by PEDs 115 on board the aircraft 160 (e.g., via access point 165). The media server 150 may store any content, including movies (e.g., "early window" titles, popular movies, etc.), shows (e.g., television "series," etc.), or other media (e.g., audio programming, etc.). Access to the content on media server 150 may be free for passengers on the aircraft 160, or passengers may pay to access some content stored on media server 150. Additionally or alternatively, PEDs 115 on board the aircraft 160 may access content stored by other media servers 155 (e.g., via aircraft communications link 145).

As shown in FIG. 1, a passenger may stream 180 an electronic media item 175 on PED 115-b from media server 150 while on the aircraft 160. Because the passenger is streaming the electronic media item 175 on PED 115-b, the passenger may control playback of the electronic media item 175. For example, the passenger may pause playback or skip back to re-watch a particular scene. Thus, the time for streaming of the electronic media item 175 is uncertain. As shown in FIG. 1, when the aircraft lands (or descends below a flight altitude at which use of PEDs 115 must be discontinued due to airline or regulatory agency rules), the streaming of the electronic media item 175 may not be complete. The passenger may disembark the aircraft 160 as shown by arrow 185. However, the passenger may like to complete viewing of the electronic media item 175 at the destination. The PED 115-b may support other connections at the aircraft destination. For example, the PED 115-b may support connection 126 to a wireless wide area network (WWAN) 125 as shown in communications environment 100, which may operate according to one or more of the various cellular communication protocols (e.g., GSM, CDMA, LTE, etc.). Additionally or alternatively, the PED 115-b may connect to a WLAN access point (not shown) at the destination.

However, the unwatched portion of the electronic media item 175 may not be available via the connection 126 for various reasons. For example, the electronic media item 175 may be an "early window" movie, for which distribution is limited to airlines who have purchased rights for viewing by their passengers. As another example, although connection 126 may provide some levels of connectivity (e.g., voice, text, etc.), it may not support a level of connectivity (e.g., IP data, broadband speeds, etc.) that enables playback of some types of media (e.g., movies, etc.). As yet another example, distribution of the electronic media item 175 may be restricted from being accessed at the destination (geographically restricted), or distribution infrastructure for access to the electronic media item 175 from the destination location may not exist. Thus, although the user would like to continue to consume the remainder of electronic media item 175, he or she may be prevented from doing so. These shortcomings of consumption of electronic media using a PED on aircraft may result in a poor user experience.

In embodiments, aspects of the communications environment 100 are configured for support of continuing electronic media entertainment after completion of a travel segment. For example, communications environment 100 may include media playback manager 135, which may communicate with other components (e.g., satellite communications system 110, cellular network 125, etc.) to provide a seamless entertainment experience for electronic media that is initially accessed while a user is travelling (e.g., on aircraft 160).

Figure 2:
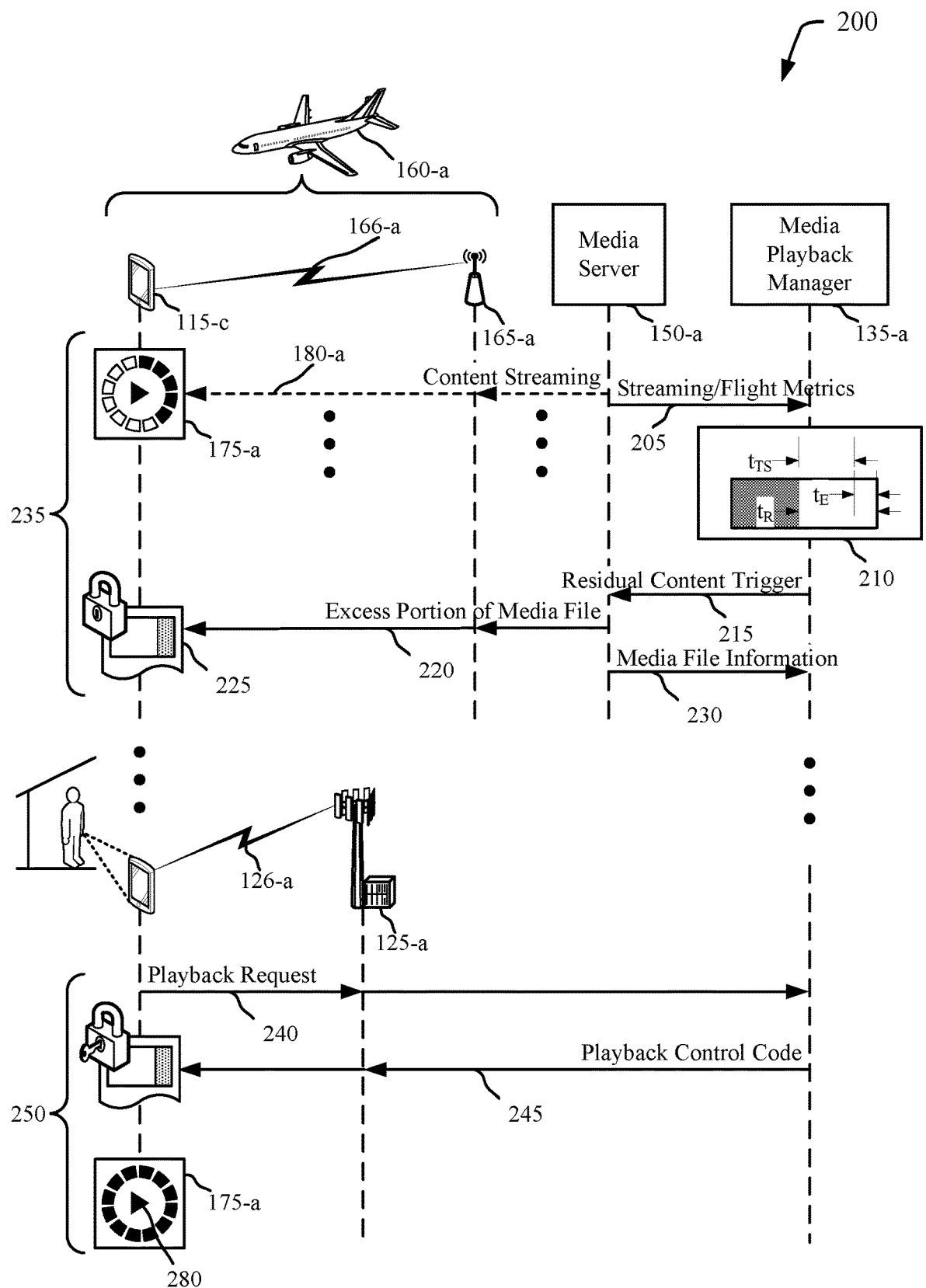
FIG. 2 shows a flow diagram for continuing electronic media entertainment after completion of a travel segment in accordance with various aspects of the disclosure.

FIG. 2 shows a flow diagram 200 for continuing electronic media entertainment after completion of a travel segment in accordance with various aspects of the disclosure. In flow diagram 200, a PED 115-c for a passenger on aircraft 160-a is connected to an access point 165-a (e.g., Wi-Fi access point, etc.) on aircraft 160-a via a first connection 166-a. The passenger may begin streaming 180-a an electronic media item 175-a from media server 150-a via the access point 165-a. Alternatively, the electronic media item 175-a may be streamed from a media server that is not located on the aircraft (e.g., media server 155 of FIG. 1, etc.).

While the electronic media item 175-a is streamed 180-a to the PED 115-c, media playback manager 135-a may monitor streaming and flight metrics 205 associated with the streaming 180-a and flight of the aircraft 160-a. Streaming and flight metrics 205 may include, for example, information regarding the amount of time remaining for streaming the electronic media item 175-a and flight metrics for the aircraft travel segment (e.g., aircraft position, aircraft speed, expected time of arrival at the destination, expected flight path, etc.).

As shown by block 210, the media playback manager 135-a may determine the time remaining for streaming 180-a of the electronic media item 175-a $t_R$ and the time remaining for the flight $t_{TS}$ (or for that portion of the flight where PED use is allowed by regulations) based on the streaming and flight metrics 205. The media playback manager 135-a may compare the time remaining for streaming 180-a of the electronic media item 175-a $t_R$ with the time remaining for the flight $t_{TS}$ and determine that an excess portion $t_E$ of the electronic media item 175-a will not have been streamed at the end of the travel segment.

Based on this determination, the media playback manager 135-a may send a residual content trigger 215 to media server 150-a indicating that the excess portion $t_E$ will remain unstreamed at the end of the travel segment. The residual content trigger 215 may trigger the media server 150-a to send the excess portion 220 of the electronic media item 175-a to the PED 115-c. The excess portion 220 may correspond to that portion at the end of the electronic media item 175-a that will remain unstreamed after the time remaining for the flight $t_{TS}$. The PED 115-c may store the excess portion 220 of the electronic media item 175-a in an access-controlled media file 225.

In some cases, the electronic media item may be one of a series of related content items (e.g., a series, etc.). The media playback manager 135-a may trigger the media server 150-a to send excess portion 220 corresponding to at least a portion of a subsequent item of the series of related content items. For example, where a user is streaming one episode of a series while aboard the aircraft 160-a that the media playback manager 135-a determines will finish streaming prior to the end of the travel segment, the media playback manager 135-a may trigger the media server 150-a to send at least a portion of one subsequent episode (e.g., the next item of the series) for local storage at the PED in the same access-controlled media file 225. The portion may correspond to the end of the subsequent episode that will remain unstreamed after the time remaining for the flight $t_{TS}$. The media server 150-a may send media file information 230 to the media playback manager 135-a, which may include information related to access control for the access-controlled media file 225.

Playback of access-controlled media file 225 may be controlled in a variety of ways. For example, the access-controlled media file 225 may store the excess portion 220 of the electronic media item 175-a in an encrypted format. In other examples, the access-controlled media file 225 may include a subset of information for the excess portion $t_E$ of the electronic media item 175-a (e.g., using "delta coding" or "dictionary coding," etc.). In yet other examples, access may be controlled at the file or application level, with access granted to the contents of the access-controlled media file 225 through the use of an authorization code.

After disembarking the aircraft 160-a at the end of the travel segment, the passenger may want to resume playback of the electronic media item 175-a. At the destination location the PED 115-c may establish a second connection 126-a with a different access point 125-a. For example, access point 125-a may be a WWAN access point or a WLAN access point.

When the passenger indicates that they wish to resume playback of the electronic media item 175-a, the PED 115-c may perform remote authorized local playback procedure 250. In remote authorized local playback procedure 250, the PED 115-c may send a playback request 240 to the media playback manager 135-a. The media playback manager 135-a may authenticate the request against the media file information 230 and send a playback control code 245 to the PED 115-c (e.g., via the second connection 126-a). The playback control code 245 may be, for example, a decryption key, a fingerprint, or an authorization code permitting playback of the electronic media item 175-a. The playback control code may be configured for a single use (e.g., a one-time password), and a new playback control code 245 may be sent if playback is stopped and resumed again. Additionally or alternatively, the playback control code 245 may be associated with an expiry time and the PED 115-c may decode the access-controlled media file 225 according to the playback control code 245 and a time code. For example, the playback control code 245 may only be valid if hashed with a device time or timestamp within a certain range of the time of receipt of the playback control code 245. In some examples, multiple playback control codes 245 may be sent periodically from the media playback manager 135-a to the PED 115-c. For example, where delta coding or dictionary coding is used for access control of the access-controlled media file 225, each playback control code 245 may provide access to a portion of the access-controlled media file 225.

The PED 115-c may then access the access-controlled media file 225 and resume playback 280 of the electronic media item 175-a. The passenger may thus be able to complete the media experience of the electronic media item 175-a in situations in which direct access to the electronic media item 175-a is not available because of bandwidth constraints of the second connection 126-a, or because of other limitations or restrictions on distribution of the electronic media item 175-a. Playback of the access-controlled media file 225 using remote authorized local playback procedure 250 may be performed using the same application running on the PED used to stream the electronic media item 175-a, in some cases.

Although illustrated as separate from the media server 150-a in the example of FIG. 2, some of the functionality described for media playback manager 135-a may be implemented at the media server 150-a (or at media server 155 as shown in FIG. 1). For example, the media server 150-a may receive and monitor streaming and flight metrics 205 to determine at 210 whether the time remaining for streaming 180-a of the electronic media item 175-a $t_R$ will exceed the time remaining for the flight $t_{TS}$.

In some examples, providing the excess portion 220 to the PED 115-c for storage in the access-controlled media file 225 is performed incrementally based on changes in the excess portion of the electronic media item 175-a determined from the streaming and flight metrics 205.

Figure 3:
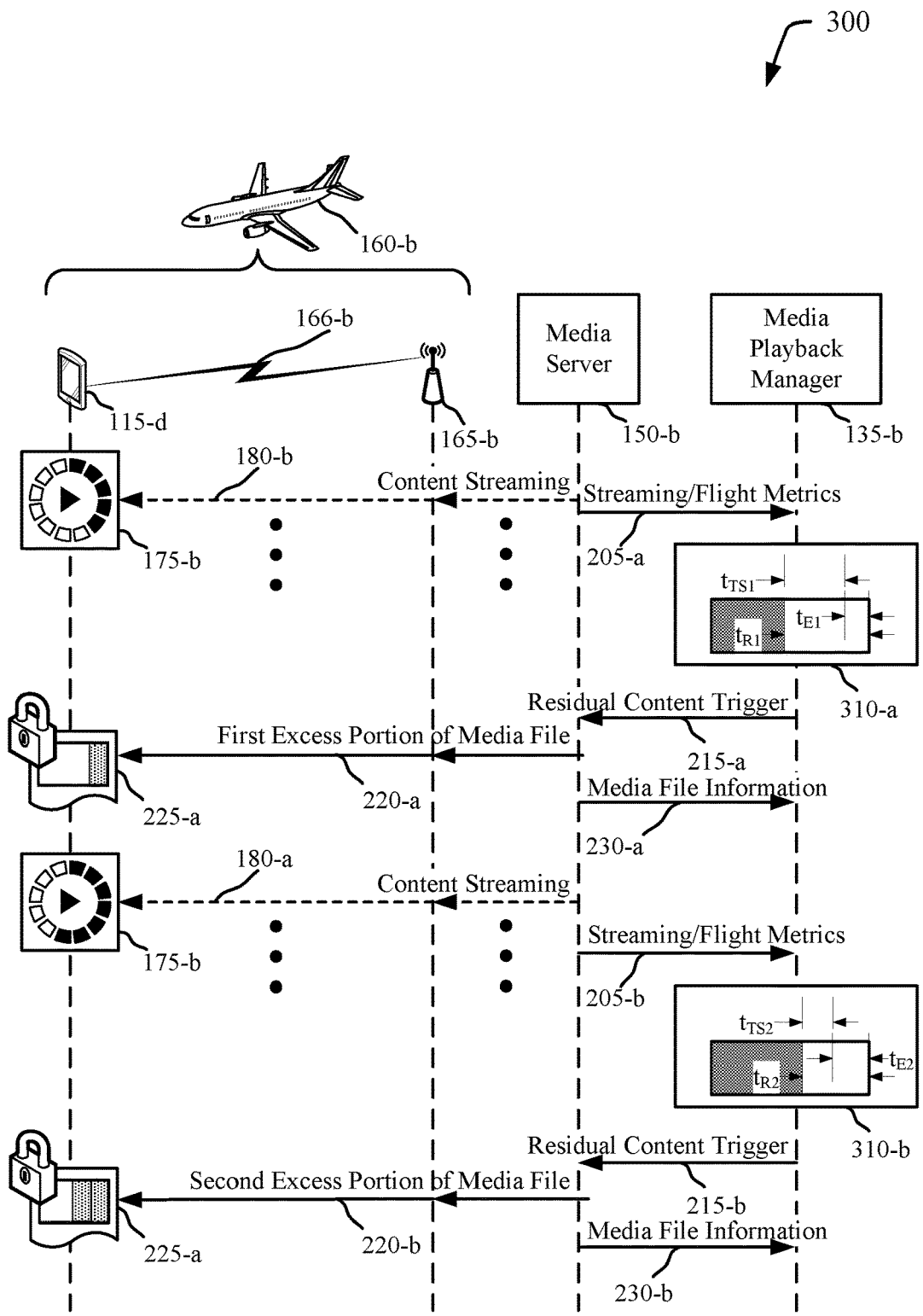
FIG. 3 shows a flow diagram for incremental update of an access-controlled media file for continuing electronic media entertainment after completion of a travel segment in accordance with various aspects of the disclosure.

FIG. 3 shows a flow diagram 300 for incremental update of an access-controlled media file for continuing electronic media entertainment after completion of a travel segment in accordance with various aspects of the disclosure. In flow diagram 300, a PED 115-d of a passenger on aircraft 160-b is connected to an access point 165-b (e.g., WLAN access point, etc.) on aircraft 160-b via a first connection 166-b. The passenger may begin streaming 180-b an electronic media item 175-b from media server 150-b via the first connection 166-b. Alternatively, the electronic media item 175-b may be streamed from a media server that is not located on the aircraft 160-b (e.g., media server 155 of FIG. 1, etc.).

While the electronic media item 175-b is streamed 180-b to the PED 115-d, media playback manager 135-b may monitor streaming and flight metrics 205. The media playback manager 135-b may receive the streaming and flight metrics 205 periodically, or triggered by various events (start of streaming, pause of streaming, change in flight metrics affecting aircraft arrival time, etc.).

Based, for example, on streaming and flight metrics 205-a, the media playback manager 135-b may determine at 310-a that the time remaining for streaming 180-b of the electronic media item 175-b $t_{R1}$ will exceed a time remaining for the flight $t_{TS1}$ (or for that portion of the flight where PED use is allowed by regulations). Thus, the media playback manager 135-b may determine that an excess portion $t_{E1}$ of the electronic media item 175-b will not have been streamed at the end of the travel segment. The media playback manager 135-b may send a residual content trigger 215-a to media server 150-*b* indicating that the excess portion $t_{E1}$ will remain unstreamed at the end of the travel segment. Based on the residual content trigger 215-*a*, the media server 150-*b* may send a first excess portion 220-*a* of the electronic media item 175-*b* to the PED 115-*d*. The PED 115-*d* may store the first excess portion 220-*a* of the electronic media item 175-*b* in an access-controlled media file 225-*a*. The media server 150-*b* may send media file information 230-*a* to the media playback manager 135-*b*, which may include information related to access control for the access-controlled media file 225-*a*.

As shown in flow diagram 300, the streaming 180-*b* of the electronic media item 175-*b* may continue. For various reasons (e.g., pausing of playback by the passenger, change in flight metrics, etc.), the difference between the time remaining in the travel segment and time remaining for streaming the electronic media item 175-*b* may change. For example, based on subsequently received streaming and flight metrics 205-*b*, the media playback manager 135-*b* may determine that the time remaining for streaming 180-*b* of the electronic media item 175-*b* $t_{R2}$ will exceed a time remaining for the flight $t_{TS2}$ by an excess portion $t_{E2}$ that is greater than the excess portion $t_{E1}$ for which the first excess portion 220-*a* had been previously sent to the PED 115-*d*.

The media playback manager 135-*b* may send a second residual content trigger 215-*b* to media server 150-*b* indicating that the excess portion $t_{E2}$ will remain unstreamed at the end of the travel segment. Based on the residual content trigger 215-*b*, the media server 150-*b* may send a second excess portion 220-*b* of the electronic media item 175-*b* to the PED 115-*d*. The second excess portion 220-*b* may correspond to a portion of the electronic media item 175-*b* prior to the first excess portion 220-*a*. The PED 115-*d* may store the second excess portion 220-*b* of the electronic media item 175-*b* in the access-controlled media file 225-*a*. The media server 150-*b* may send additional media file information 230-*b* to the media playback manager 135-*b*, which may include information related to access control for the access-controlled media file 225-*a*, if modified by the addition of the second excess portion 220-*b*.

After disembarking the aircraft at the end of the travel segment, the passenger may resume playback of the electronic media item 175-*b* using the techniques discussed above for acquiring a playback control code corresponding to the access-controlled media file 225-*a* via a second connection and resuming playback (e.g., remote authorized local playback procedure 250).

Figure 4:
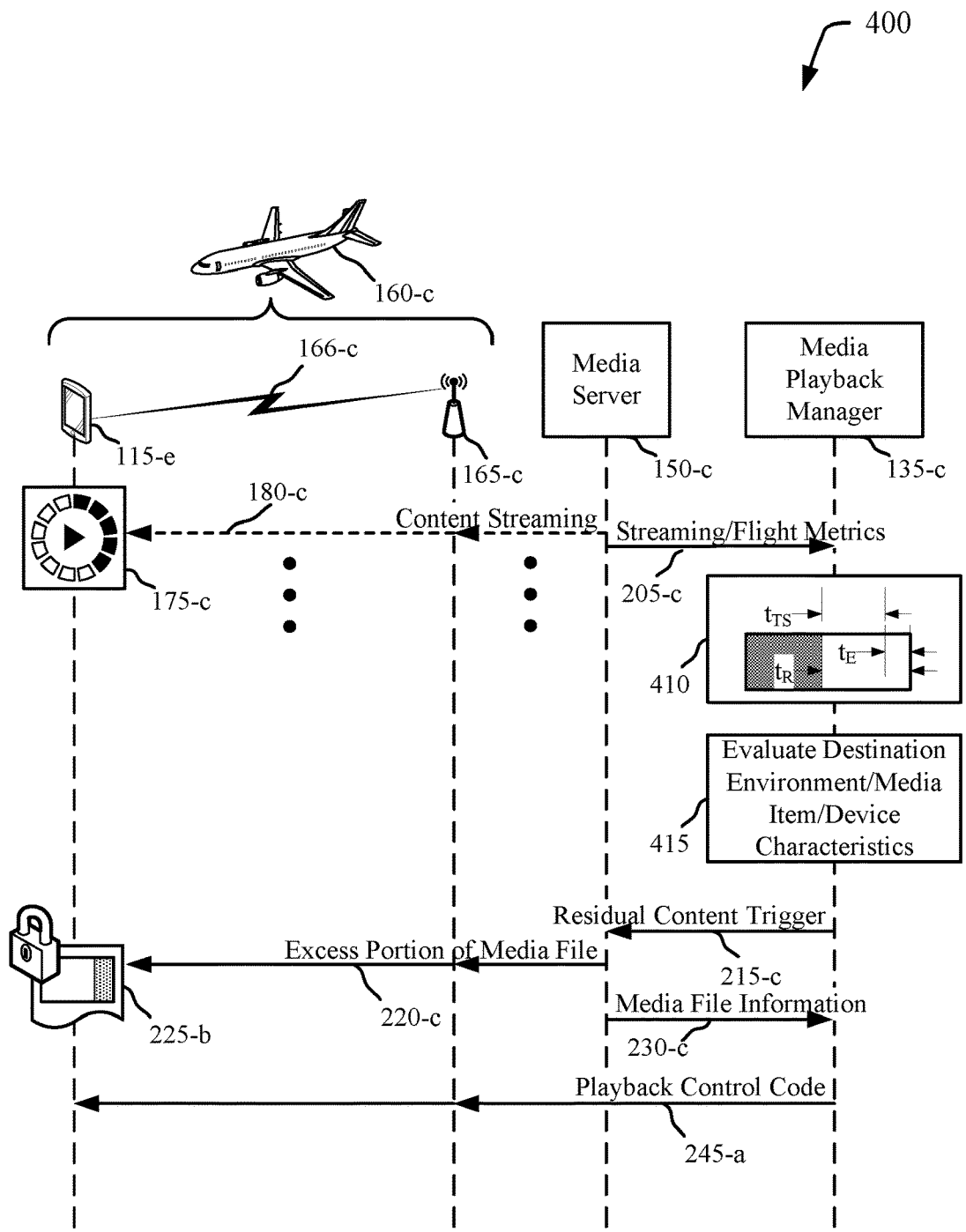
FIG. 4. shows a flow diagram for continuing electronic media entertainment after completion of a travel segment in accordance with various aspects of the disclosure.

In some cases, whether to trigger sending of the excess portion 220 of an electronic media item 175 to the PED 115 may depend on characteristics of the destination location or PED 115. FIG. 4 shows a flow diagram 400 for continuing electronic media entertainment after completion of a travel segment in accordance with various aspects of the disclosure. In flow diagram 400, a PED 115-*e* of a passenger on aircraft 160-*c* establishes a first connection 166-*c* to an access point 165-*c* (e.g., WLAN access point, etc.) on aircraft 160-*c*. The passenger may begin streaming 180-*c* an electronic media item 175-*c* (e.g., from media server 150-*c* or media server 155 of FIG. 1, etc.) via the access point 165-*c*.

While the electronic media item 175-*c* is streamed 180-*c* to the PED 115-*e*, media playback manager 135-*c* may monitor streaming and flight metrics 205-*c*. The media playback manager 135-*c* may receive the streaming and flight metrics 205-*c* periodically, or triggered by various events (start of streaming, pause of streaming, change in aircraft arrival time, etc.).

The media playback manager 135-*c* may determine at 410 that the time remaining for streaming 180-*c* of the electronic media item 175-*c* $t_R$ will exceed a time remaining for the flight $t_{TS}$ (or for that portion of the flight where PED use is allowed by regulations). Thus, the media playback manager 135-*c* may determine that an excess portion $t_E$ of the electronic media item 175-*c* will not have been streamed at the end of the travel segment.

At 415, the media playback manager 135-*c* may evaluate characteristics of the destination environment and/or electronic media item 175-*c* to determine whether to trigger sending of the excess portion $t_E$ of the electronic media item 175-*c* to be stored at the PED 115-*e*. For instance, the media playback manager 135-*c* may determine that availability of connectivity is limited at the destination location (e.g., connection speeds are generally too low for streaming of the electronic media item 175-*c*, etc.) and that local storage of the excess portion $t_E$ is likely necessary for the passenger to be able to complete the media consumption experience. For example, the media playback manager 135-*c* may determine the availability of connectivity at the destination location by maintaining (or otherwise having access to) a lookup table, or any other suitable data structure, of the availability of connectivity (e.g., typical or known connection speeds) at various destination locations. The media playback manager 135-*c* may then compare the availability of connectivity at the destination location to a threshold to determine whether to trigger sending of the excess portion $t_E$ of the electronic media item 175-*c*. In some cases, even where connectivity is generally good at the destination location, distribution of the electronic media item 175-*c* may be restricted. For example, an "early release" movie may be available on the aircraft 160-*c* for streaming (free of charge or fee-based, etc.) but digital distribution of the electronic media item 175-*c* may not be otherwise available. Alternatively, the electronic media item 175-*c* may be available for purchase on the aircraft 160-*c*, but would require the passenger to purchase a second streaming session to complete playback after disembarking the aircraft 160-*c*.

Additionally or alternatively, whether the media playback manager 135-*c* triggers sending of the excess portion $t_E$ of the electronic media item 175-*c* to be stored at the PED 115-*e* may be based on characteristics of the PED 115-*e*. For example, devices that support only certain types of connections (e.g., Wi-Fi, Bluetooth, etc.) may only have connectivity when within range of wired LAN or WLAN access point, and not generally within the coverage area of a WWAN (e.g., cellular network). In some cases, whether to send the excess portion $t_E$ of the electronic media item 175-*c* to be stored at the PED 115-*e* may be based on certain combinations of characteristics of the destination location for the aircraft 160-*c*, characteristics of the PED 115-*c*, and/or characteristics (e.g., content provider, media type, etc.) of the electronic media item 175-*c*.

If, at 415, the media playback manager 135-*c* determines to trigger sending the excess portion $t_E$ to the PED 115-*c*, the media playback manager 135-*a* may send residual content trigger 215-*c* to media server 150-*c*. The residual content trigger 215-*c* may trigger the media server 150-*c* to send the excess portion 220-*c* of the electronic media item 175-*c* to the PED 115-*e*. The excess portion 220-*c* may correspond to that portion at the end of the electronic media item 175-*c* that will remain unstreamed after the time remaining for the flight $t_{TS}$. The PED 115-*c* may store the excess portion 220-*c* of the electronic media item 175-*c* in an access-controlled media file 225-*b*. The media server 150-*c* may send media file information 230-*c* to the media playback manager 135-*c*, which may include information related to access control for the access-controlled media file 225-b.

In some examples, the media playback manager 135-c may send an initial playback control code 245-a to the PED 115-e (e.g., via access point 165-c) while the PED 115-e is still on the aircraft 160-c. The initial playback control code 245-a may allow the passenger to access the access-controlled media file 225-b to resume playback of the electronic media item 175-c for a period of time without any further communication with media playback manager 135-c. For example, the initial playback control code 245-a may be associated with an expiry time relative to a time of receipt of the access-controlled media file 225-b and the PED 115-e may decode the access-controlled media file 225-b according to the playback control code 245-a and a time code. The expiry time may be implemented in a variety of ways. For example, the initial playback control code 245-a may only be valid if hashed with a device time or timestamp within a certain range of the time of receipt of the access-controlled media file 225-b.

Where the passenger has not completed playback of the electronic media item 175-c within the expiry time, the PED 115-e can revert to the remote authorized local playback procedure 250 as shown in FIG. 2 to resume playback.

Some PEDs 115 may have limited connectivity. For example, many common PEDs 115 such as tablets or laptop computers support LAN connections (e.g., WLAN, Ethernet, etc.) and/or personal area network (PAN) connections (e.g., Bluetooth, etc.), but do not support connectivity via a WWAN. Thus, in many environments these PEDs 115 only have direct Internet connectivity when in range of a WLAN access point. As passengers may want to resume playback of an electronic media item in many different types of environments (e.g., indoors, busses, trains, outdoors, etc.), receiving a playback control code 245 at the PED 115 via a second direct connection may not always be feasible.

Figure 5:
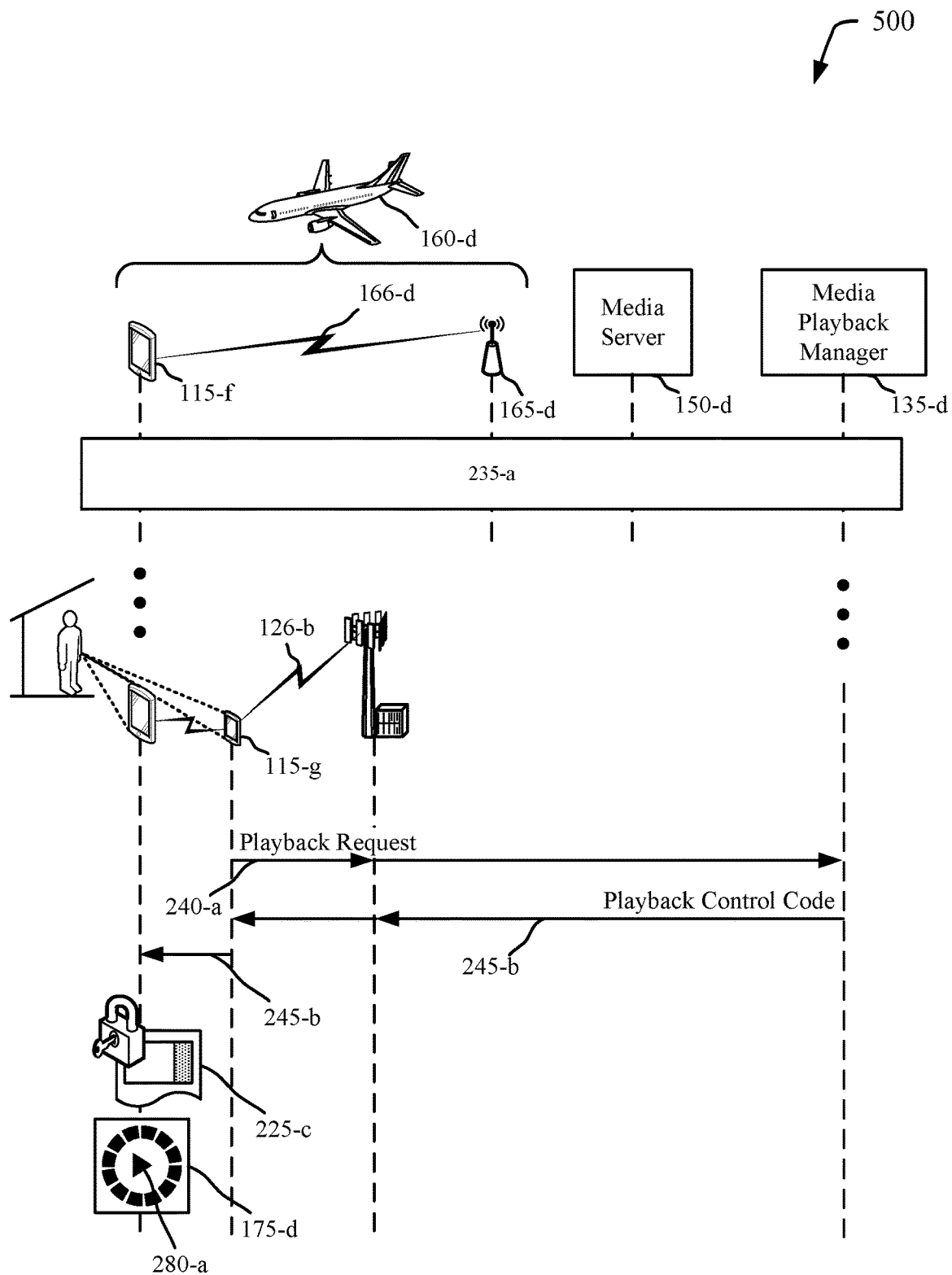
FIG. 5 shows a flow diagram for continuing electronic media entertainment after completion of a travel segment using an indirect second connection in accordance with various aspects of the disclosure.

FIG. 5 shows a flow diagram 500 for continuing electronic media entertainment after completion of a travel segment using an indirect second connection in accordance with various aspects of the disclosure. In flow diagram 500, a PED 115-f for a passenger on aircraft 160-d is connected to an access point 165-d (e.g., Wi-Fi access point, etc.) on aircraft 160-d.

In block 235-a, the passenger may begin streaming an electronic media item 175-d (e.g., from media server 150-d or media server 155 of FIG. 1, etc.) via the access point 165-d. The media playback manager 135-d may determine that an excess portion of an electronic media item 175-d will not have been streamed at the end of the travel segment and trigger the media server 150-d to send the excess portion of the electronic media item 175-d to the PED 115-c while the PED 115-f is still on the aircraft 160-d for storage in an access-controlled media file 225-c. Block 235-a may include, for example, the steps and communication shown in flow portion 235 of FIG. 2.

At the destination, the passenger may wish to resume playback of the electronic media item 175-d. However, the PED 115-f may not have direct connectivity to send and receive communications to the media playback manager 135-d from the passenger's current location. For example, the PED 115-f may support some types of connections (e.g., Wi-Fi, etc.), but not be within range of any access points for supported types of connections. The passenger may also have a second PED 115-g that does have direct connectivity via communication link 126-b (e.g., via a WWAN connection, etc.). For example, the PED 115-f may be a tablet computer that supports WLAN connectivity but not WWAN connectivity and may be in a location where no WLAN connectivity is available. The second PED 115-g may be a smartphone that supports WWAN connectivity and can establish connection 126-b at the location.

In some examples, the passenger may request a playback control code for playback of the electronic media item 175-d using the second PED 115-g. The second PED 115-g may request the playback control code using information associated with the access-controlled media file 225-c. The information may be passed between the PED 115-f and the second PED 115-g in a variety of ways. In some examples, the PED 115-f and second PED 115-g communicate over a PAN connection (e.g., Bluetooth, NFC, Infrared, USB, Lightning, etc.). In other examples, the information may be passed without a PAN connection between the PED 115-f and second PED 115-g. For example, audio or visual information may be passed using the output devices (e.g., screen, speaker, etc.) of the PED 115-f and received on an input device of the second PED 115-g (e.g., camera, microphone, etc.). In one example, a QR code including the information may be displayed on the PED 115-f and the PED 115-g may be used to take a picture of the screen of the PED 115-f to read the information. In yet other examples, a code associated with the access-controlled media file 225-c may be displayed on the PED 115-f and manually entered into the PED 115-g. In still yet other examples, the PED 115-g may be associated (e.g., paired) with the PED 115-f for IFE media playback and may receive information for requesting a playback control code for the access-controlled media file 225-c from media playback manager 135-d directly (e.g., via access point 165-d and/or via connection 126-b).

With the information associated with the access-controlled media file 225-c from the PED 115-f, the second PED 115-g may be used to send a request 240-a to the media playback manager 135-d. The media playback manager 135-d may authenticate the request against the media file information and send a playback control code 245-b to the second PED 115-g (e.g., via the second connection 126-b). The playback control code 245-b may be, for example, a decryption key, a fingerprint, or an authorization code permitting playback of the electronic media item 175-d. Transfer of the playback control code 245-b from the second PED 115-g to the PED 115-f may be done by way of any of the techniques discussed above for transferring the information associated with the access-controlled media file 225-c to the second PED 115-g (e.g., PAN, input/output devices, manual entry, etc.).

The PED 115-f may then access the access-controlled media file 225-c and resume playback 280-a of the electronic media item 175-d. The passenger may thus be able to complete the media experience of the electronic media item 175-d even in situations in which the PED 115-f does not have direct connectivity.

Figure 6:
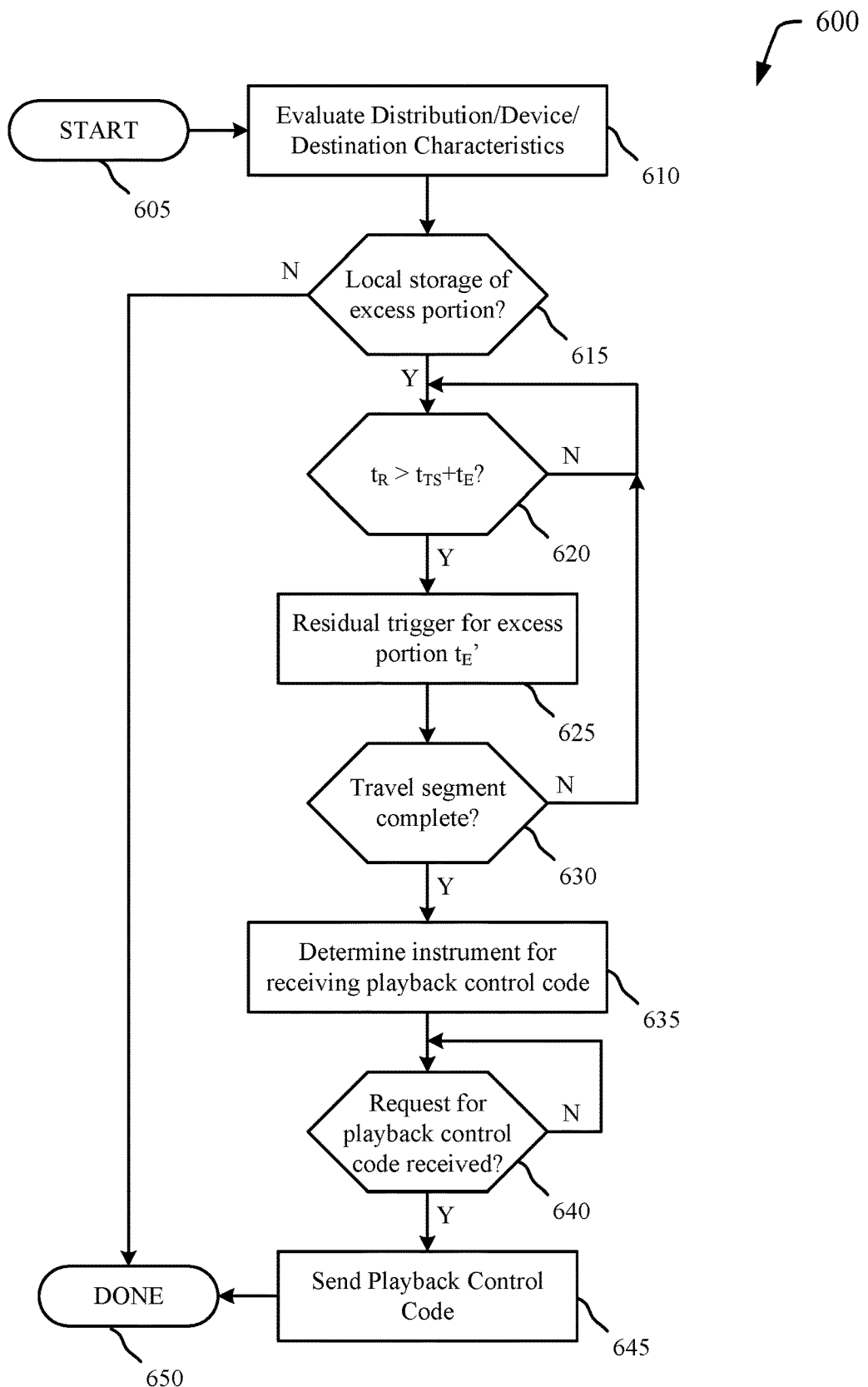
FIG. 6 shows a diagram of a method flow for continuing electronic media entertainment after completion of a travel segment in accordance with various aspects of the disclosure.

FIG. 6 shows a diagram of a method flow 600 for continuing electronic media entertainment after completion of a travel segment in accordance with various aspects of the disclosure. Method flow 600 may be performed by, for example, media playback managers 135 of FIGS. 1-5.

Method flow 600 may begin at block 605 where the media playback manager 135 may be notified that in-flight streaming of an electronic media item to a PED 115 on an aircraft has begun (e.g., the electronic media item has been purchased or otherwise accessed).

At block 610, the media playback manager 135 may evaluate characteristics of the PED 115 to determine whether the PED 115 is capable of supporting local storage for residual playback (e.g., has an IFE residual playback application installed, etc.). The media playback manager 135 may also evaluate characteristics of the destination environment and/or electronic media item to determine if local storage for residual playback is likely to enhance the user experience. If, at block 615, the media playback manager 135 determines, based on the evaluation at block 610, that local storage for residual playback is likely to enhance the user experience, method flow 600 proceeds to block 620 to monitor streaming metrics for the electronic media item and flight metrics for the travel segment of the aircraft.

At block 620, the media playback manager 135 monitors the streaming and flight metrics and compares the time remaining for streaming of the electronic media item $t_R$ to the time remaining for the flight $t_{TS}$ (or for that portion of the flight where PED use is allowed by regulations) and the excess portion $t_E$ of the electronic media item currently stored at the PED 115 (e.g., null at the start of message flow 600). If the media playback manager 135 determines that the remaining streaming time $t_R$ is greater than the remaining time in the flight segment $t_{TS}$ plus any excess portion of the electronic media item already stored at the PED $t_E$, the media playback manager 135 may trigger, at block 625, sending of an excess portion $t_E'$ to be sent to the PED for storage in an access-controlled media file. The excess portion $t_E'$ may be, for example, the portion of the electronic media item directly prior to the excess portion $t_E$ already stored at the PED 115 in the access-controlled media file, if any. In some examples, the excess portion $t_E'$ may include padding to allow the passenger to re-watch a portion of the electronic media item prior to where streaming will end at the end of the travel segment (e.g., to refresh their memory of where they left off, etc.).

In some examples, the media playback manager 135 may determine at block 625 what type of access control is to be used for the access-controlled media file. The type of access control may depend on, for example, characteristics of the PED 115, destination location, and/or the electronic media item. For example, delta coding or dictionary coding may be used in environments where connectivity is relatively better while file encryption or file locking may be used in environments where connectivity is relatively worse or only certain types of data can be received (e.g., text, etc.). Additionally or alternatively, different access control levels may be assigned to different electronic media items (e.g., based on desired security level, etc.) and the type of access control may be selected based on the access control level of the streamed electronic media item.

At block 630, the media playback manager 135 may determine whether the travel segment is complete (or almost complete). If the travel segment is complete, the method flow 600 may proceed to block 635, where the instrument for receiving a playback control code for the access-controlled media file may be determined. The determination may be based on, for example, characteristics of the PED 115 (e.g., types of connectivity, etc.) or user selection. For example, the passenger may indicate that they wish to receive the playback control code via a paired second PED 115 because of the wider availability of connectivity via the second PED 115. If, at block 630, the travel segment is not complete (or almost complete), the media playback manager 135 may continue to monitor streaming metrics for the electronic media item and flight metrics for the travel segment of the aircraft.

Once the travel segment has completed, the media playback manager 135 may monitor for a request for a playback control code for the electronic media item at block 640. If a request for a playback control code for the electronic media item is received at block 640, the media playback manager 135 may authenticate the request and send the playback control code via the instrument determined at block 635. The method flow 600 may then complete at block 650. In some examples, the playback control code sent at block 645 may be associated with an expiry time, in which case the media playback manager 135 may monitor for additional requests at block 640 after sending the playback control code at block 645. Additionally or alternatively, the playback control code sent at block 645 may be usable for playback of a subset of the excess portion of the electronic media item stored at the PED 115. For example, each playback control code may apply for a portion of the excess portion of the electronic media item stored at the PED 115 in the access-controlled media file. Additional requests may be received at block 640 for each portion as the user continues playback.

Figure 7:
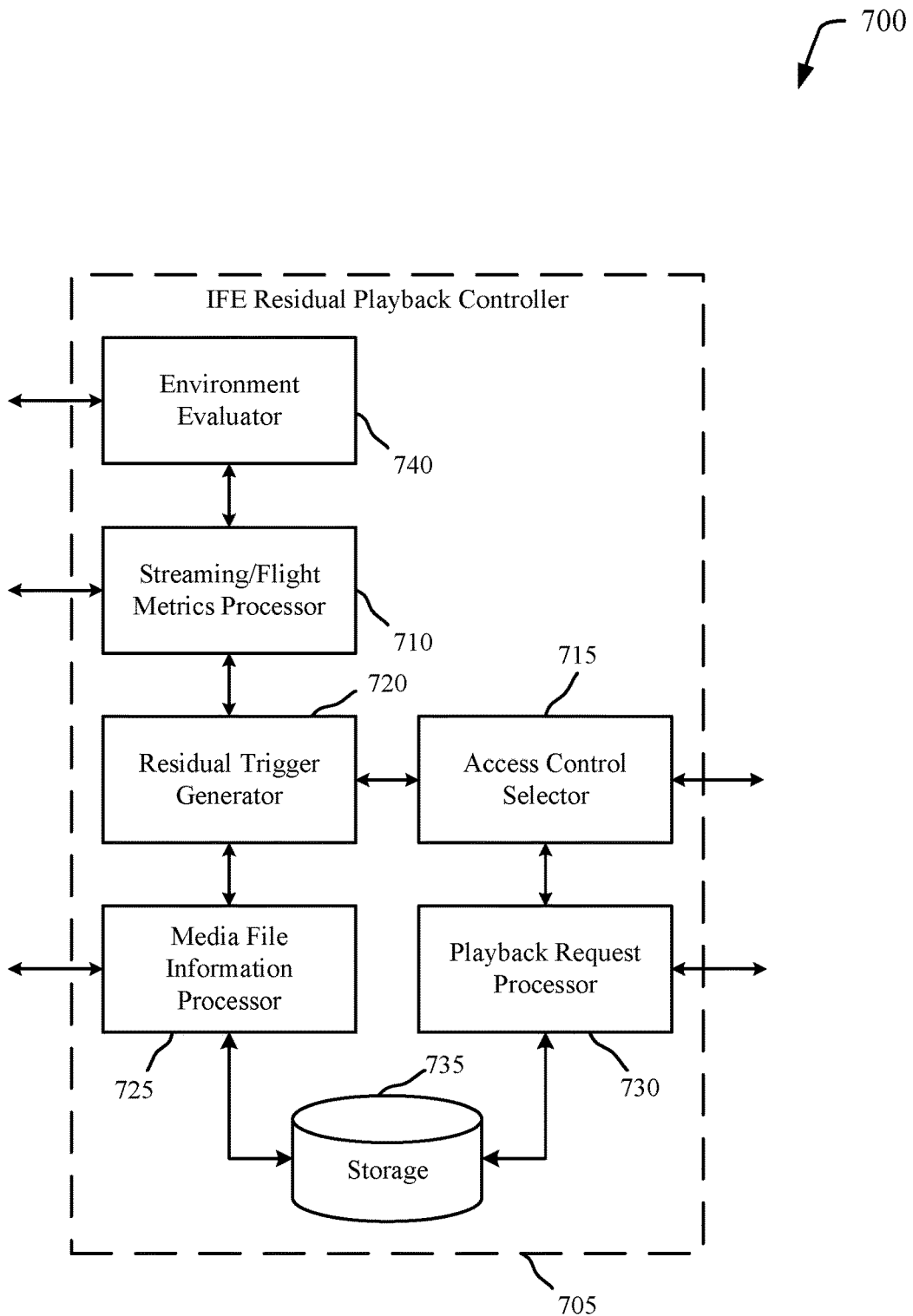
FIG. 7 shows a block diagram of an IFE residual playback controller for continuing electronic media entertainment after completion of a travel segment in accordance with various aspects of the disclosure.

FIG. 7 shows a block diagram 700 of an IFE residual playback controller 705 for continuing electronic media entertainment after completion of a travel segment in accordance with various aspects of the disclosure. The IFE residual playback controller 705 may illustrate, for example, aspects of media playback managers 135 discussed above with reference to FIGS. 1-6. The IFE residual playback controller 705 may include streaming/flight metrics processor 710, residual trigger generator 720, access control selector 715, media file information processor 725, playback request processor 730, storage 735, and/or environment evaluator 740. Each of these components may be in communication with each other, directly or indirectly.

Environment evaluator 740 may evaluate characteristics of the PED 115 (e.g., type of device, installed applications, etc.), the destination environment (e.g., availability and type of connectivity at the destination of an aircraft, etc.), and/or an electronic media item to determine if local storage for residual playback is likely to enhance the user experience. The environment evaluator may determine whether to enable local storage for residual playback for streaming sessions to PEDs 115 aboard aircraft.

Streaming/flight metrics processor 710 may control functions related to receiving and processing of metrics related to streaming of electronic media items (e.g., time remaining for streaming, etc.) and flight metrics related to travel segments for aircraft on which the electronic media items are being streamed. Streaming/flight metrics processor 710 may determine for various streaming sessions to PEDs 115 on the aircraft that the time remaining for streaming of an electronic media item $t_R$ will exceed a time remaining for the flight $t_{TS}$ (or for that portion of the flight where PED use is allowed by regulations). Thus, the streaming/flight metrics processor 710 may determine that an excess portion $t_E$ of the electronic media item will not have been streamed at the end of the travel segment. Streaming/flight metrics processor 710 may exchange information with the residual trigger generator 720 related to the excess portion $t_E$.

Access control selector 715 may determine a type of access control is to be used for an access-controlled media file for local storage at the PED of the excess portion $t_E$ of an electronic media item. The type of access control may depend on, for example, characteristics of the PED 115, destination location, and/or the electronic media item as discussed above. Access control selector 715 may exchange information with the residual trigger generator 720 related to the type of access control to be used.

The residual trigger generator 720 may send a residual content trigger to a media server (e.g., media servers 150, 155 of FIG. 1, etc.) to trigger the media server to send the excess portion of the electronic media item to the PED 115 for local storage in an access-controlled media file.

The media file information processor 725 may receive information related to the access-controlled media file stored locally at the PED 115. The media file information may include PED information (e.g., MAC address, etc.) and/or access-control information for the access-controlled media file (e.g., encryption information, file locking information, dictionary coding information, etc.). The media file information processor 725 may store the media file information in storage 735.

The playback request processor 730 may receive playback requests from PEDs 115 as a result of the users requesting to resume playback of electronic media items. The playback request processor 730 may authenticate the requests against media file information and send playback control codes to the PEDs based on successful authentication of the requests. The playback control codes may be sent via a different connection to the PEDs than used for streaming of the electronic media items.

In various examples of an IFE residual playback controller 705, one or more of the blocks shown may be implemented as portions (e.g., functional blocks, etc.) of software/firmware code stored in memory at a device (e.g., at media playback manager 135 as discussed with reference to FIGS. 1-6). In such examples, any of the respective communications may be implemented by passing parameters or references between the respective portions of code. Additionally or alternatively, one or more of the blocks shown, or any portion thereof, may be implemented by separate hardware units (e.g., application specific integrated circuits (ASICs), etc.), including portions of code executed at standalone processors. In such examples, any of the respective communications may be implemented as a wired or wireless signal transmission between the respective separate hardware units.

Figure 8:
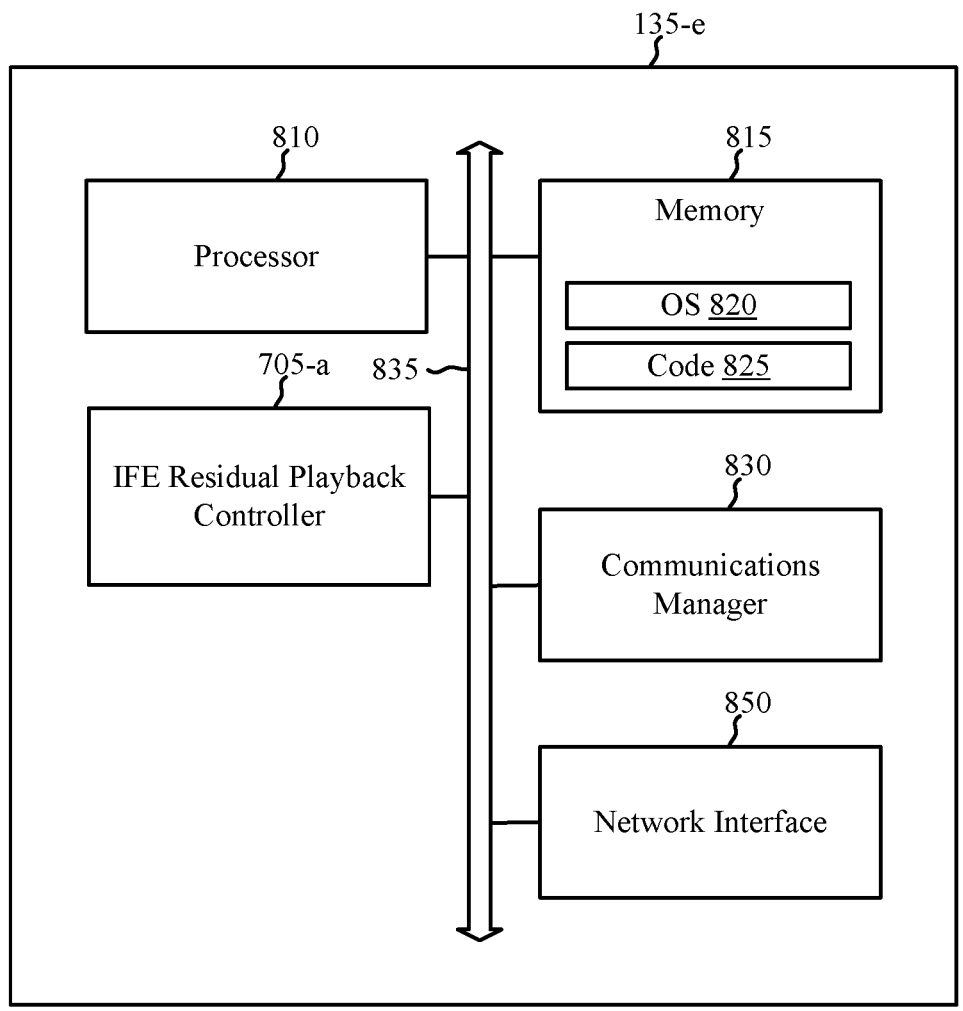
FIG. 8 shows a block diagram of a media playback manager for continuing electronic media entertainment after completion of a travel segment in accordance with aspects of the present disclosure.

FIG. 8 shows a block diagram 800 of a media playback manager 135-e for continuing electronic media entertainment after completion of a travel segment in accordance with aspects of the present disclosure. The media playback manager 135-e may be an example of media playback managers 135 of FIGS. 1-5. The media playback manager 135-e may include a processor 810, memory 815, a communications manager 830, and a network interface 850. Each of these components may be in communication with each other, directly or indirectly, over one or more buses 835.

The memory 815 may include random access memory (RAM) and/or read-only memory (ROM). The memory 815 may store an operating system (OS) 820 (e.g., built on a Linux or Windows kernel). The memory 815 may also store computer-readable, computer-executable code 825 including instructions that are configured to, when executed, cause the processor 810 to perform various functions described herein related to continuing electronic media entertainment after a travel segment. Alternatively, the code 825 may not be directly executable by the processor 810 but be configured to cause the media playback manager 135-e (e.g., when compiled and executed) to perform one or more of the functions described herein.

The media playback manager 135-e may include an IFE residual playback controller 705-a, which may be an example of the IFE residual playback controller of FIG. 7. The IFE residual playback controller 705-a may manage various aspects of continuing electronic media entertainment after a travel segment (e.g., monitoring flight and streaming metrics, triggering sending excess portions of electronic media items for local storage at PEDs, managing playback authorization, generating playback control codes, etc.) as described herein.

Figure 9:
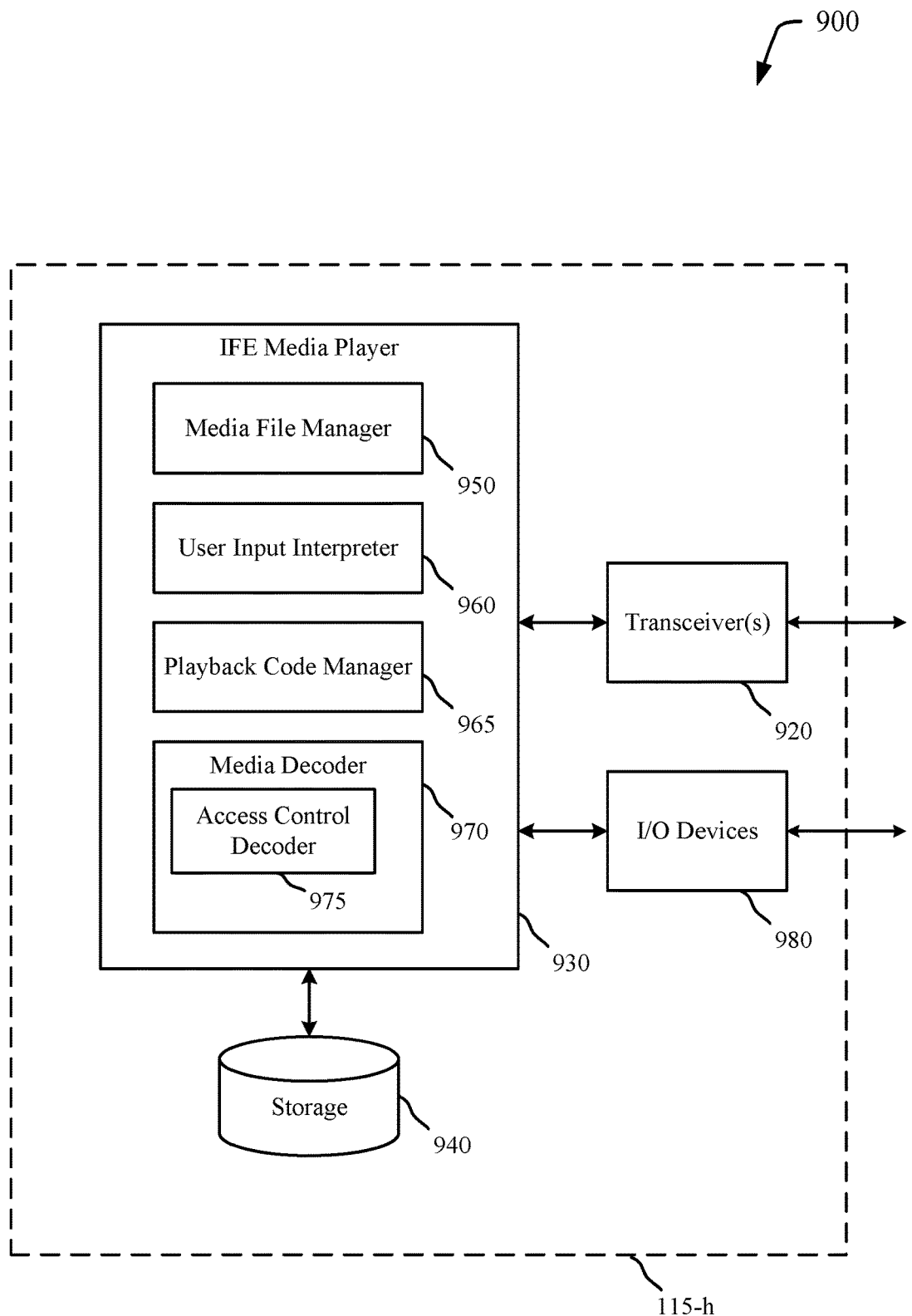
FIG. 9 shows a block diagram of a PED configured for continuing electronic media entertainment after completion of a travel segment in accordance with aspects of the disclosure.

FIG. 9 shows a block diagram 900 of a PED 115-h configured for continuing electronic media entertainment after completion of a travel segment in accordance with aspects of the disclosure. PED 115-h may illustrate for example, aspects of PEDs 115 discussed above with reference to FIGS. 1-6. PED 115-h may include transceiver(s) 920, IFE media player 930, and storage 940.

The transceiver(s) 920 may include one or more modems configured to modulate data (e.g., packet data, voice data, etc.) and transmit the modulated data via one or more wired or wireless communication links (e.g., WWAN communication links, WLAN communication links, etc.). The one or more modems may also be configured to demodulate data received via the one or more wired or wireless communication links and provide the data to other components of the PED 115-h.

The IFE media player 930 may be configured to support streaming and local playback of residual portions of electronic media items. The IFE media player 930 may receive user input via I/O devices 980 (e.g., user commands to start/pause/stop/resume playback of an electronic media item). IFE media player 930 may include media file manager 950, user input interpreter 960, playback code manager 965, and media decoder 970. IFE media player 930 may be an application or a combination of application layer, service layer, and/or library layer components.

When the PED 115-h is on-board an aircraft, the IFE media player 930 may be used to stream an electronic media item from a media server, which may be either on-board or external to the aircraft. For example, the media file manager 950 may present electronic media items available from one or more media servers (e.g., on-board the aircraft or external to the aircraft, etc.) via an access point on the aircraft and the user may select an electronic media item for streaming. The user input interpreter 960 may detect the selection and communicate the selection to the media file manager 950. The media file manager 950 may request streaming of the selected electronic media item from the media server via a first communication connection (e.g., with the access point on the aircraft). The media server may begin streaming the selected electronic media item, which may be decoded by the media decoder 970 and the decoded media sent to the I/O devices 980 (e.g., screen, speaker, etc.) for display to the user.

Based on a residual content trigger (e.g., from a media playback manager 135), the media server may send an excess portion of the electronic media item to the IFE media player 930 via the first communication connection. The excess portion may be, for example, the portion of the electronic media item that will remain unstreamed at the end of the travel segment for the aircraft based on the time remaining for streaming the electronic media item and the time remaining in the travel segment (e.g., or that portion of the travel segment for which the streaming is allowed by regulations, etc.). The media file manager 950 may receive the excess portion and store the excess portion of the electronic media item in an access-controlled media file in storage 940. Storage 940 may be, for example, a solid-state storage device (e.g., solid state drive (SSD), flash memory, etc.) or any other type of non-volatile storage media (e.g., hard disk drive (HDD), etc.).

Subsequently, the user may disembark the aircraft and the PED 115-h may establish a second communication connection (e.g., with a WWAN or WLAN access point at the destination, etc.). The user may indicate to the IFE media player 930 (e.g., via I/O devices 980 and user input interpreter 960) that they wish to resume playback of the electronic media item. The playback code manager 965 may send (e.g., via transceiver(s) 920) a request for a playback control code for the access-controlled media file. The request may be sent, for example, via the second communication connection. The playback code manager 965 may receive a playback control code for the access-controlled media file via the second communication connection and provide the playback control code to the media decoder 970.

The media decoder 970 may include an access control decoder 975 for decoding the access-controlled media file based on the received playback control code. In some examples, access control for the access-controlled media file may be by way of encryption and the playback control code may be a decryption code. Alternatively, the access-controlled media file may be dictionary-coded and the playback control code may be one or more fingerprints for the dictionary-coded file. In yet other examples, access control for the access-controlled media file may be by way of locking the access-controlled media file (e.g., application-level or service level file locking, etc.), and the playback control code may be an authorization code for unlocking the file. In some examples, a playback control code may permit access to a portion of the access-controlled media file and multiple playback control codes may be requested, received, and used for decoding respective portions of the access-controlled media file during playback of the electronic media item.

In some examples, the playback code manager 965 may receive an initial playback control code via the first communication connection (e.g., while the PED 115-h is still on the aircraft) that may allow access to the access-controlled media file for a period of time without any further communication with a media playback manager. For example, the initial playback control code may be associated with an expiry time relative to a time of receipt of the access-controlled media file. For example, the initial playback control code may be valid for a certain range of the time of receipt of the access-controlled media file. Where playback of the electronic media item has not completed within the expiry time, the playback code manager 965 can request an additional playback control code via the second communication connection.

In some examples, the playback code manager 965 may receive a playback control code via an indirect connection. Receiving the playback control code via an indirect connection may be useful in instances where PED 115-h has limited connectivity at the destination location. For example, many common PEDs 115 such as tablets or laptop computers support LAN connections (e.g., WLAN, Ethernet, etc.) and/or PAN connections (e.g., Bluetooth, etc.), but do not support connectivity via a WWAN. Thus, in many environments these PEDs 115 only have direct Internet connectivity when in range of a WLAN access point. However, a user may have a second PED 115 that may support WWAN connectivity and may be able to retrieve a playback control code in situations where the PED 115-h that has the stored access-controlled media file does not have connectivity. As discussed above with reference to FIG. 5, the user may request a playback control code for playback of the electronic media item 175-d using the second PED 115, which may exchange information for requesting the playback control code with the PED 115-h (e.g., via a PAN connection, via audio/visual data exchange, manually entered information, etc.). Using the information, the second PED 115 may be used to send a request for the playback control code to a media playback manager 135, and receive the playback control code. Transfer of the playback control code from the second PED 115 to the PED 115-h may be done by the same method used for exchange of information for requesting the playback control code, or a different one of the discussed techniques, in some cases.

Figure 10:
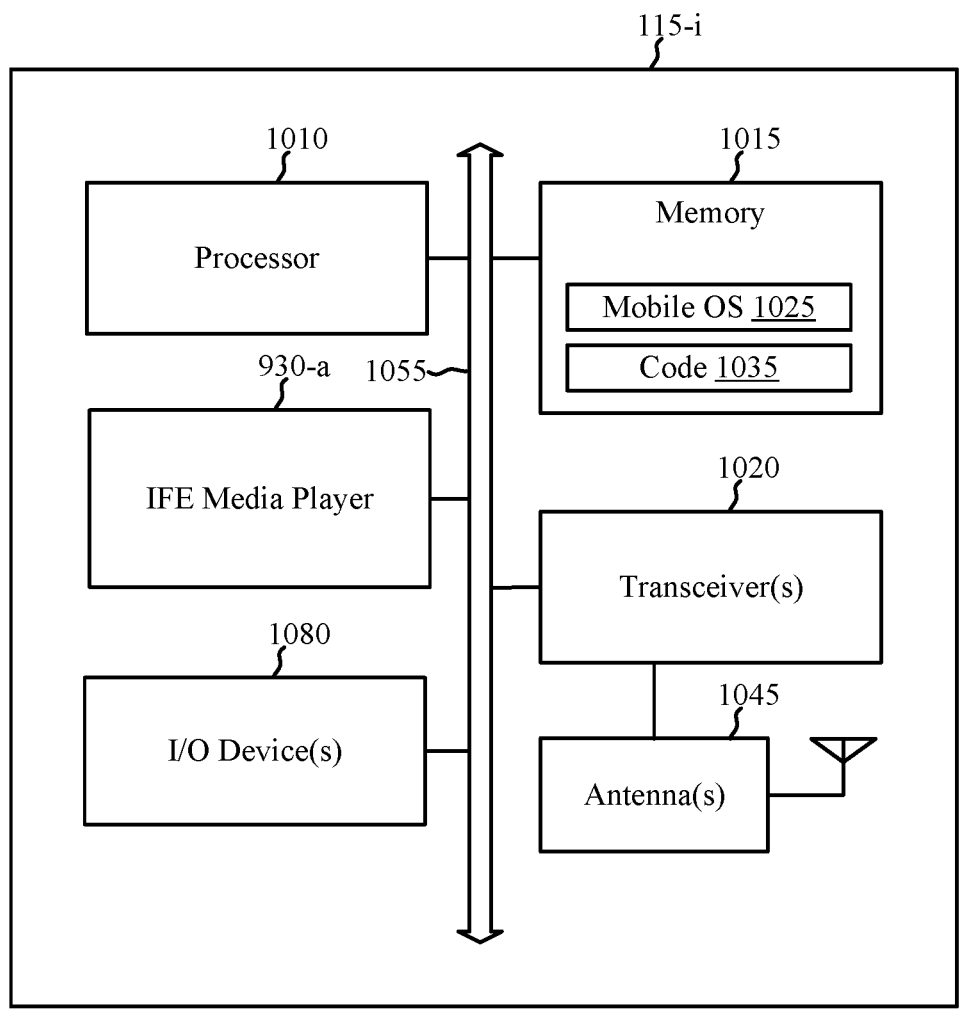
FIG. 10 shows a block diagram of a PED configured for continuing electronic media entertainment after completion of a travel segment in accordance with aspects of the disclosure.

FIG. 10 shows a block diagram 1000 of a PED 115-i configured for continuing electronic media entertainment after completion of a travel segment in accordance with aspects of the disclosure. The PED 115-i may have various configurations and may be or be part of a cellular telephone, a smartphone, a tablet, a PDA, a digital video recorder (DVR), an internet appliance, a gaming console, an e-reader, or the like. The PED 115-i may, in some examples, have an internal power supply, such as a small battery, to facilitate mobile operation. In some examples, the PED 115-i may be an example of aspects of one or more of the PEDs 115 described with reference to any of FIG. 1-6 or 9. The PED 115-i may be configured to implement at least some of the features and functions described with reference to any of FIGS. 1-6.

The PED 115-i may include a processor 1010, memory 1015, one or more transceiver(s) 1020, one or more antenna(s) 1045, IFE media player 930-a, and/or I/O devices 1080. Each of these components may be in communication with each other, directly or indirectly, over one or more buses 1055.

The memory 1015 may include random access memory (RAM) and/or read-only memory (ROM). The memory 1015 may store at least a mobile OS 1025. The mobile OS 1025 may be built on a Linux or Windows kernel and may be, for example, an Android mobile OS, Apple iOS mobile OS, or Windows Phone mobile OS. The memory 1015 may also store computer-readable, computer-executable code 1035 including instructions that are configured to, when executed, cause the processor 1010 to perform various functions described herein related to security monitoring and notification. Alternatively, the code 1035 may not be directly executable by the processor 1010 but be configured to cause the mobile device 115-i (e.g., when compiled and executed) to perform one or more of the functions described herein.

The processor 1010 may include an intelligent hardware device, e.g., a CPU, a microcontroller, an ASIC, or the like. The processor 1010 may process information received through the transceiver(s) 1020 and/or information to be sent to the transceiver(s) 1020 for transmission through the antenna(s) 1045. The processor 1010 may handle, in connection with the transceiver(s) 1020 various aspects of communicating over (or managing communications over) a radio frequency spectrum.

The transceiver(s) 1020 may include a modem configured to modulate packets and provide the modulated packets to the antenna(s) 1045 for transmission, and to demodulate packets received from one or more antenna(s) 1045. The transceiver(s) 1020 may, in some examples, be implemented as one or more transmitter modules and one or more separate receiver modules. The transceiver(s) 1020 may support wireless communication using one or more radio access technologies. The transceiver(s) 1020 may be configured to communicate bi-directionally, via the antenna(s) 1045, with one or more WLAN, WWAN, and/or PAN devices and/or networks as described above.

The one or more I/O devices 1080 may include one or more cameras, microphones, audio devices such as speakers, display devices such as a touch-sensitive screen, switches, buttons, click-wheel(s), motors, actuators, electromagnets, piezoelectric sensors, network interface cards, USB controllers, storage devices, or any other type of hardware device that can be part of or communicatively coupled with the PED 115-i and used by a user to input information or to provide information to the user.

The IFE media player 930-a may be configured to perform and/or manage some or all of the features and/or functions described with reference to any of FIGS. 1-6 related to playback of streaming media via a first connection, receiving an access-controlled media file via the first connection, storing the access controlled media file, requesting and/or receiving a playback code via a second connection, and/or resuming playback using the playback control code as described above. The IFE media player 930-a may be an example of the IFE media player 930 discussed above with reference to FIG. 9.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Processors may perform the necessary tasks. Features implementing functions may also be physically located at various positions, including being distributed such that portions of functions are implemented at different physical locations.

Furthermore, embodiments may be implemented by hardware, software, firmware, middleware, microcode, hardware description languages, or combinations thereof. When implemented in software, firmware, middleware or microcode, the program code or code segments to perform the necessary tasks may be stored in a computer-readable medium such as a storage medium. A computer-readable medium may include, for example, RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method, comprising:
   identifying, for a personal electronic device in a vehicle, that streaming of a first remaining portion of an electronic media item from a current playback position to the personal electronic device via a first communication connection will exceed a remaining time period of a travel segment of the vehicle by a first excess portion, wherein the first communication connection comprises a first access point that is located in the vehicle;
   transmitting, based at least in part on the identifying, at least a portion of the first excess portion of the electronic media item to the personal electronic device via the first communication connection to be stored in an access-controlled media file, wherein the first excess portion corresponds to an end of the electronic media item and a second portion of the electronic media item is between the current playback position and a start of the first excess portion, the second portion of the electronic media item corresponding to the remaining time period of the travel segment, wherein the at least the portion of the first excess portion of the electronic media item is transmitted while streaming the second portion of the electronic media item to the personal electronic device;
   monitoring the streaming of the second portion of the electronic media item to determine whether the streaming of the second portion of the electronic media item will exceed the remaining time period of the travel segment;
   receiving, via a second communication connection, a request for resuming playback of the electronic media item, wherein the second communication connection is exclusive of the first access point; and
   transmitting a playback control code to the personal electronic device via the second communication connection, the playback control code specific to the stored access-controlled media file and permitting playback of the access-controlled media file at the personal electronic device.

2. The method of claim 1, wherein the second communication connection comprises a second access point that is not located in the vehicle.

3. The method of claim 2, wherein the first access point is associated with a first communication protocol and the second access point is associated with a second, different communication protocol.

4. The method of claim 1, further comprising:
determining whether to transmit the at least the portion of the first excess portion of the electronic media item to the personal electronic device based on one or more of: availability of connectivity at a destination location of the travel segment; availability of content distribution of the electronic media item at the destination location of the travel segment; a connection capability of the personal electronic device; or a user-specific configuration associated with the personal electronic device.

5. The method of claim 1, further comprising:
determining the remaining time period of the travel segment of the vehicle based on at least one of a current vehicle location, a destination location, a current vehicle speed, or an estimated vehicle speed.

6. The method of claim 1, wherein the access-controlled media file is encrypted and the playback control code comprises a decryption key of the access-controlled media file.

7. The method of claim 1, wherein the access-controlled media file comprises one or more dictionary-coded data blocks and the playback control code comprises respective fingerprints for the one or more dictionary-coded data blocks.

8. The method of claim 1, wherein the access-controlled media file comprises a locked media file and the playback control code comprises an authorization code.

9. The method of claim 1, wherein the electronic media item comprises a series of related content items and the first remaining portion comprises at least a portion of a first item of the series of related content items, the method further comprising:
transmitting at least a portion of a second, subsequent item of the series of related content items to the personal electronic device for storing in the access-controlled media file.

10. The method of claim 1, wherein the playback control code is associated with an expiry time relative to a time of receipt of the access-controlled media file.

11. An apparatus, comprising:
a processor;
memory in electronic communication with the processor; and
instructions stored in the memory and executable by the processor to cause the apparatus to:
identify, for a personal electronic device in a vehicle, that streaming of a first remaining portion of an electronic media item from a current playback position to the personal electronic device via a first communication connection will exceed a remaining time period of a travel segment of the vehicle by a first excess portion, wherein the first communication connection comprises a first access point that is located in the vehicle;
transmit, based at least in part on the identifying, at least a portion of the first excess portion of the electronic media item to the personal electronic device via the first communication connection to be stored in an access-controlled media file, wherein the first excess portion corresponds to an end of the electronic media item and a second portion of the electronic media item is between the current playback position and a start of the first excess portion, the second portion of the electronic media item corresponding to the remaining time period of the travel segment, wherein the at least the portion of the first excess portion of the electronic media item is transmitted while streaming the second portion of the electronic media item to the personal electronic device;
monitor the streaming of the second portion of the electronic media item to determine whether the streaming of the second portion of the electronic media item will exceed the remaining time period of the travel segment;
receive, via a second communication connection, a request for resuming playback of the electronic media item, wherein the second communication connection is exclusive of the first access point; and
transmit a playback control code to the personal electronic device via the second communication connection, the playback control code specific to the stored access-controlled media file and permitting playback of the access-controlled media file at the personal electronic device.

12. The apparatus of claim 11, wherein the second communication connection comprises a second access point that is not located in the vehicle.

13. The apparatus of claim 12, wherein the first access point is associated with a first communication protocol and the second access point is associated with a second, different communication protocol.

14. The apparatus of claim 11, wherein the instructions are executable by the processor to cause the apparatus to:
determine whether to transmit the at least the portion of the first excess portion of the electronic media item to the personal electronic device based on one or more of: availability of connectivity at a destination location of the travel segment; availability of content distribution of the electronic media item at the destination location of the travel segment; a connection capability of the personal electronic device; or a user-specific configuration associated with the personal electronic device.

15. The apparatus of claim 11, wherein the instructions are executable by the processor to cause the apparatus to:
determine the remaining time period of the travel segment of the vehicle based on at least one of a current vehicle location, a destination location, a current vehicle speed, or an estimated vehicle speed.

16. The apparatus of claim 11, wherein the access-controlled media file is encrypted and the playback control code comprises a decryption key of the access-controlled media file.

17. The apparatus of claim 11, wherein the access-controlled media file comprises one or more dictionary-coded data blocks and the playback control code comprises respective fingerprints for the one or more dictionary-coded data blocks.

18. The apparatus of claim 11, wherein the access-controlled media file comprises a locked media file and the playback control code comprises an authorization code.

19. The apparatus of claim 11, wherein the electronic media item comprises a series of related content items and the first remaining portion comprises at least a portion of a first item of the series of related content items, and wherein the instructions are executable by the processor to cause the apparatus to:

transmit at least a portion of a second, subsequent item of the series of related content items to the personal electronic device for storing in the access-controlled media file.

20. The apparatus of claim 11, wherein the playback control code is associated with an expiry time relative to a time of receipt of the access-controlled media file.

* * * * *